United States Patent [19]

Forson

[11] Patent Number: 4,879,739
[45] Date of Patent: Nov. 7, 1989

[54] WIRING TEST DEVICE AND METHOD
[76] Inventor: Henry M. Forson, 4218 Downing St., Annandale, Va. 22003
[21] Appl. No.: 284,391
[22] Filed: Dec. 14, 1988
[51] Int. Cl.⁴ .......................... H04B 3/46; H04M 1/24
[52] U.S. Cl. ........................................ 379/21; 379/25; 379/29; 379/26; 324/542; 324/133
[58] Field of Search ............... 379/23, 6, 25, 21, 27, 379/26, 29, 32; 324/542, 66, 133

[56] References Cited
U.S. PATENT DOCUMENTS
4,596,904 6/1986 Messenger ......................... 379/25

Primary Examiner—Stafford D. Schreyer
Attorney, Agent, or Firm—Foley & Lardner, Schwartz, Jeffery, Schwaab, Mack, Blumenthal & Evans

[57] ABSTRACT

A battery powered, hand-held signal generator adapted to be connected to home or business telephone line at the interface between the telephone company wiring or the home or business wiring. The signal generator successively applies a uniquely coded pulsed signal to each wire of the line. The invention further includes a hand-held receiver adapted to be plugged into each modular telephone jack of the home or business line. The receiver contains four separate receiving circuits, one of which is connected to each wire of the line. Each receiving circuit includes a visual indicator such as an LED for visually indicating reception of a pulsed signal through that wire. By monitoring the reception of pulses over each wire, the user of the device can determine if each of the wires is properly connected. Reception of the wrong code on a given wire indicates a cross connection with the wire on which the received code is transmitted. Reception of the same code on more than one wire indicates a short between the wires. Failure to receive any code on a wire indicates an open break.

14 Claims, 5 Drawing Sheets

PRIOR ART

PRIOR ART

NON-FAULT LINE CORRECT FLASH SEQUENCE

SHORT-CIRCUIT BETWEEN LINES 2 AND 3

CROSS-CONNECT INVOLVING LINES 2, 3, AND 4

OPEN-CIRCUIT IN LINE

WIRING TEST DEVICE AND METHOD

BACKGROUND OF THE INVENTION

A typical ISDN system is illustrated in FIG. 1. The system includes external network 1 and a local network 2. The external network comprises central office 3 and a two wire "U" interface bus or line 4. The local network 2 comprises a network terminating unit (NTU) 5, a plurality of terminal equipment (TE) 6, and a four wire "S" or "T" interface bus or line. The "S" interface allows for multiple equipment (TE) to be attached in a party line configuration. Two of the four wires are used for transmission, and the remaining two are used for reception. The TEs 6 have the ability to transmit and receive data in accordance with the synchronization with network signals. In order for multiple TEs 6 to work, it is desirable that each TE 6 send the same polarity of signal to the NTU 5. When the four wire "S" interface wiring is being installed, it would be useful for the installer to know that all four wires are properly connected to each modular outlet corresponding to a potential TE 6 location without any short circuits, open circuits, or cross-connections.

A prior art system which is directed to detecting such faults in cables has been disclosed in U.S. Pat. No. 3,986,106 issued to Shuck et al. The Shuck et al. system is directed to a portable cable test set which includes a master unit connected to one end of a multiple wire cable and a remote unit connected to the other end of the cable. The pulse generator within the master unit generates a sequence of pulses of equal magnitude. The master unit gates a pulse to a preselected tip or ring wire of a predetermined cable pair. The pulse passes through the wire to the remote unit at the end of the cable where it then passes through a resistor of preselected value which is connected to the other tip or ring wire of the wire pair. A pulse comparator in the master unit compares the magnitude of the pulse return from the remote unit with the pulse passing through the reference resistance in the master unit. If the comparator determines that the pulse magnitudes are equal, the master unit then automatically sequences to the next cable pair and repeats the foregoing test. In the event of detection of unequal pulse magnitudes, a sequence interrupter in the master unit stops the test sequence, and a visual indicator identifies the wire pair having conditions activating the sequence interrupter.

Other prior art systems include U.S. Pat. No. 4,536,703 issued to Jablway et al. which discloses a complicated device for testing telephone wiring designed for use in a central office to check C.O. battery and ground on the wires. The U.S. Pat. No. 3,492,571 issued to Desler discloses a system for testing an electrical circuit for continuity, shorts and cross connections, terminals of the circuit are tested in groups, with the terminal groups being sequentially connected to the apparatus in pairs. In testing a pair of the terminal groups, a separate signal is applied to each of the terminals thereof in succession and the other terminals are monitored to detect an error in the electrical circuit. Detection of an error interrupts the testing operation and energizes circuitry for indicating the terminals involved and the nature of the defect.

However, these prior art systems fail to provide a line testing apparatus which is sufficiently portable, inexpensive, and relatively non-complicated in operation. The prior art systems for the most part do not provide line testing apparatus which is easily adaptable to home or office communication lines and which supply an easily comprehensible display of any detected faults in a particular line.

It is therefore an object of the present invention to provide a system and method for satisfying the above-mentioned needs. An installer would remove the NTU 5 and any TE 6 from the line that is desired to be tested. A signal generator would be connected to the "S" interface wiring 7, creating a distinctive signal on each line. The installer would take a receiving device, plug it successively into each modular connector, and verify that all four signals were received on the proper lines. Among the desirable criteria for the system and method were that since the "S" interface wiring could be up to a kilometer long, there should be no interconnecting wires between the generator and the receiver, other than the "S" interface bus 7 being tested. The signal generator and receiver should not be limited to require only a main source of power (120V AC), but to be open to the use of battery power. Since a NTU 5 could put 50 or more volts between the transmit and receive pairs to power a TE 6, the signal generator should be able to withstand being plugged into a live ISDN outlet. The receiver should also be able to withstand 50 volts between any lines, and ideally indicate the presence of voltage on a theoretically disconnected "S" interface bus. The unit would preferable be hand-held, portable, and manufactured and sold at a low cost for mass production. Furthermore, the information displayed to a user of the system should be relatively simple to understand, yet as informative as possible with relation to the open circuits, short circuits, and cross-connections that may have occurred in the wiring.

SUMMARY OF THE INVENTION

The present invention is directed to a battery powered, hand-held signal generator adapted to be connected to home or business telephone lines at the interface between the telephone company wiring and the home or business wiring. The signal generator successively applies a uniquely coded pulsed signal to each wire of the line. The invention further includes a hand-held receiver adapted to be plugged into each modular telephone jack of the home or business line. The receiver contains four separate receiving circuits, one of which is connected to each wire of the line. Each receiving circuit includes a visual indicator such as an LED for visually indicating reception of a pulsed signal through that wire. By monitoring the reception of pulses over each wire, the user of the device can determine if each of the wires is properly connected. Reception of the wrong code on a given wire indicates a cross connection with the wire on which the received code is transmitted. Reception of the same code on more than one wire indicates a short between the wires. Failure to receive any code on a wire indicates an open break.

The objects of the invention are achieved in particular by providing a system for detecting faults in a line which consists of a plurality of wires therein. The system includes a generating unit having a generating port, which is removably connectable to one end of the line, for generating coded pulse signals on each of the plurality of wires. The system further includes a receiving unit having a receiving port, which is removably connectable to an opposite end of the line, for receiving and displaying the coded pulse signals generated by the generating unit.

BRIEF DESCRIPTION OF THE DRAWINGS

The invention will be explained in more detail with reference to the accompanying drawings, in which.

DETAILED DESCRIPTION OF PREFERRED EMBODIMENTS

Figure 1:
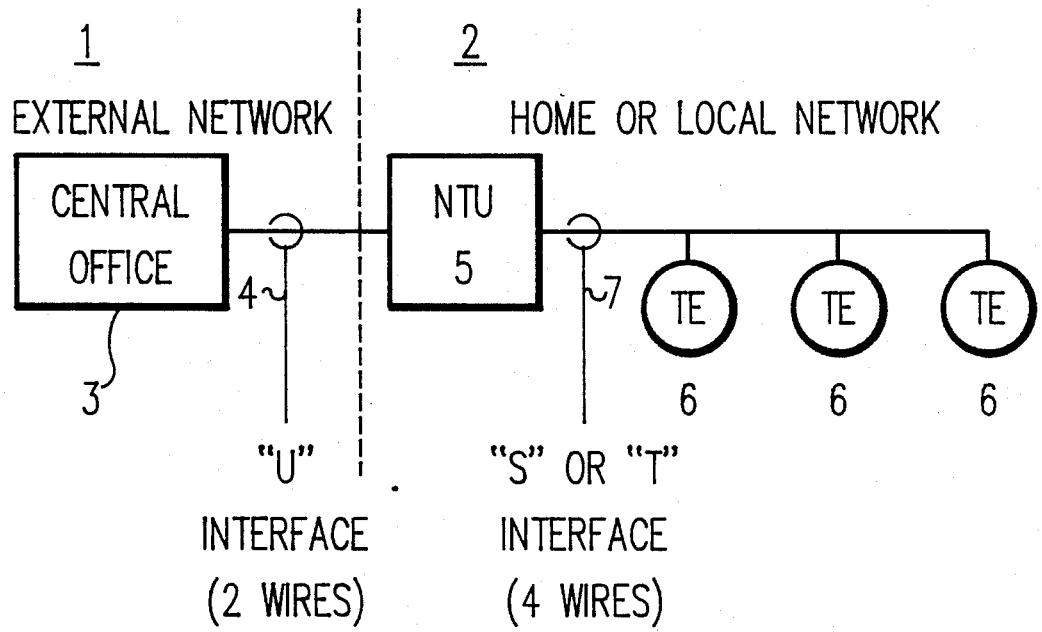
FIG. 1 illustrates a typical ISDN system.
Figure 2:
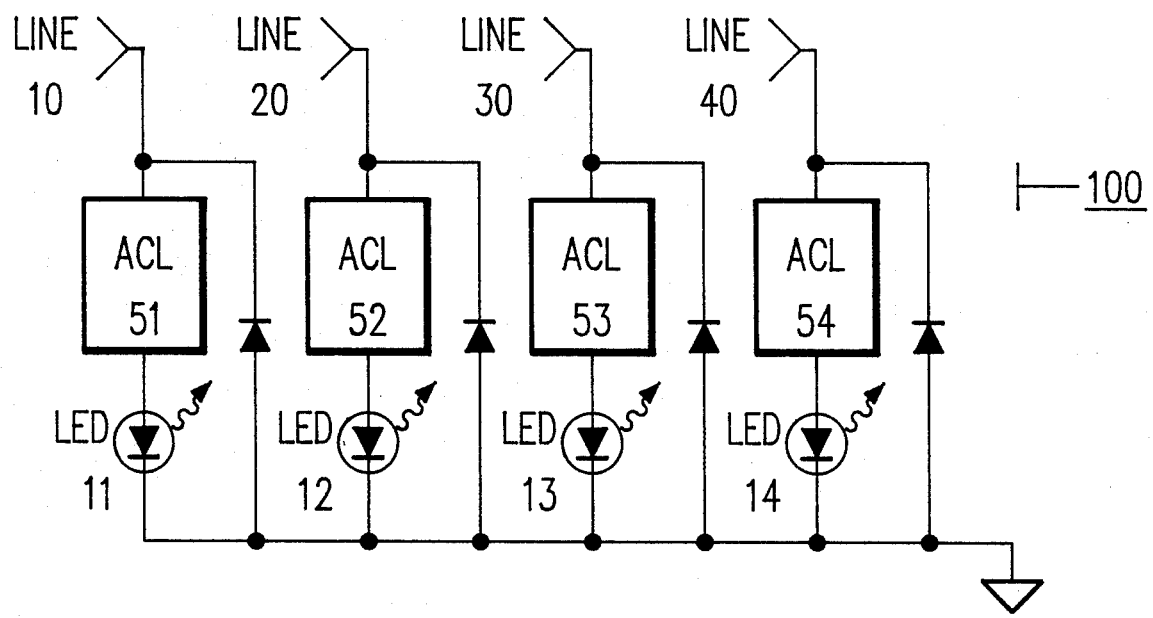
FIG. 2 illustrates a circuit schematic of a receiver unit according to the instant invention.

Referring now to FIG. 2, there is shown a simple schematic of a receiving unit 100 according to the invention. Each receiving unit 100 essentially comprises four similar circuits, each line having a dedicated circuit associated therewith. Each line of the interface bus 10, 20, 30, 40 is connected to a respective active current limiter 51, 52, 53, 54. The active current limiters are in turn connected to display LEDs 11, 12, 13, 14, which in turn are connected to a common bus. Ground return diodes 61, 62, 63, 64 are provided in parallel with the active current limiters and LEDs and are connected between lines 10, 20, 30, 40 and the common bus.

For exemplary purposes, assume line 10 is positive with respect to line 20, e.g., by 10 volts or more. A current (approximately 10 ma) will flow through active current limiter 51, and LED 11 which is connected to the common bus, thus lighting the LED 11. The ground return diodes will then route the current to the most negative line or lines, which in this example is line 20, thus completing the circuit. Due to the nature of the voltage drop across a LED and the active current limiter, any line which is approximately 3.3 volts more positive than the most negative line should have its corresponding LED activated.

Figure 3:
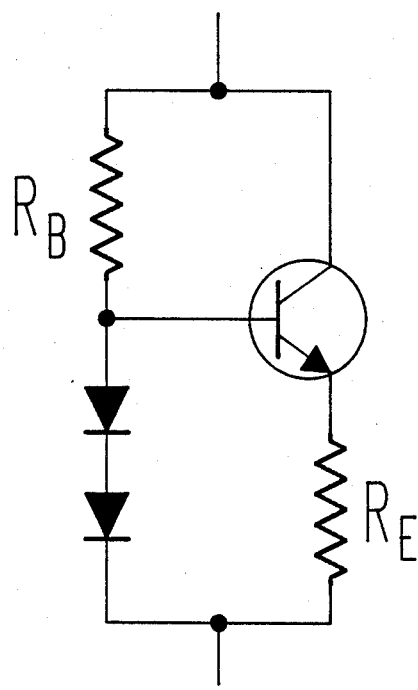
FIG. 3 shows a schematic of a known active current limiter.

The active current limiters 51, 52, 53, 54 are illustrated in FIG. 3. This configuration of a current limiter is well known in the prior art. Basically, when the voltage drop across $R_E$ exceeds approximately 0.6 volts, the diodes conduct in a manner to short the base current and limit the transistors pass current. In the preferred embodiment, $R_E$ was chosen to be 56 ohms, resulting in about 10 ma of LED drive, the 56 ohms being a standard value near the theoretical 60 ohms. $R_B$ was chosen to be 8.6 K ohms in a preferred embodiment, its value depending on the transistors gain among other things. Since the diode current also flows through the LED, to limit the total LED current to approximately 20 ma when 60 volts is applied the current through $R_B$ should be less than 10 ma, or $R_B$ should be greater than 6K ohms. However, a resistance which is too high will require either very high gain transistors, or a high voltage differential across $R_B$. For a resistance $R_B$ equal to 8.6K ohms, and a 0.5 volt drop across $R_B$ and a transistor gain ($H_{fe}$) of 100, the emitter current is only 5-6 ma. This is enough current to light the LED, however, the LED would not be at maximum brightness. Transistor power dissipation is also a factor to be considered, in that 60 V × 10 ma = 600 mW, and the transistor's breakdown voltage should be above 60 volts. In a preferred embodiment of the invention, a power-tab transistor similar to TIP 29A-series was utilized.

Figure 9:
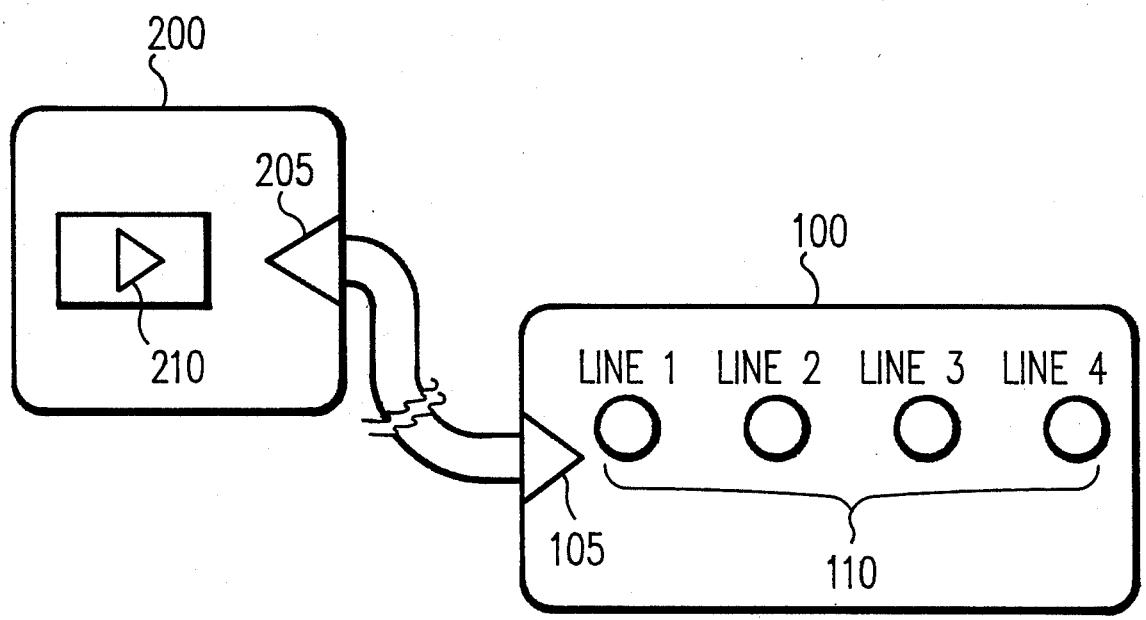
FIG. 9 illustrates a preferred embodiment of the signal generator and receiver unit connected to a tested line according to the instant invention.

The receiver unit 100 itself, as shown in FIG. 9, is preferably built into a plastic case, with dimensions 1"×2"×3" or any dimensions which would be sufficiently portable, with four LEDs 110 mounted on the casing. An RJ-45 style (eight position) modular jack 105 allows for a modular cable to connect the receiver unit 100 to an ISDN "S" interface bus modular outlet.

Figure 5:
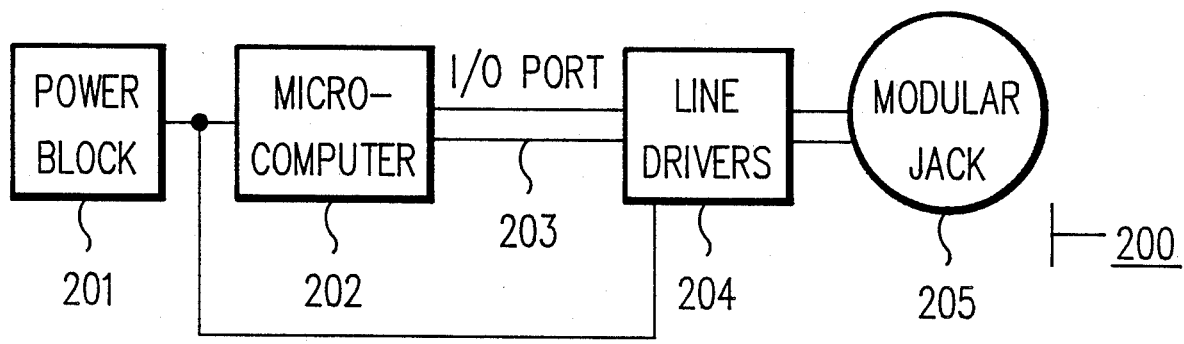
FIG. 5 illustrates a schematic of a signal generator according to the instant invention.
Figure 4A:
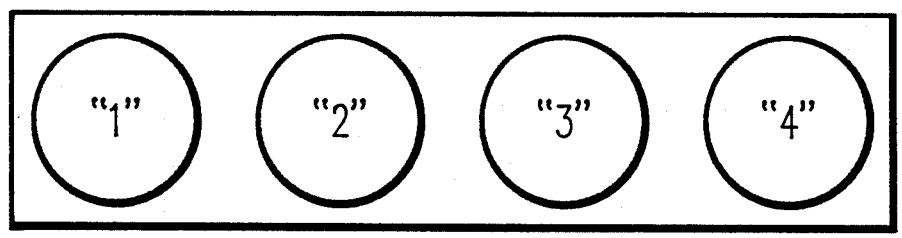
FIGS. 4a-4d show signal patterns received and displayed by a receiver unit with respect to a tested line.
Figure 4B:
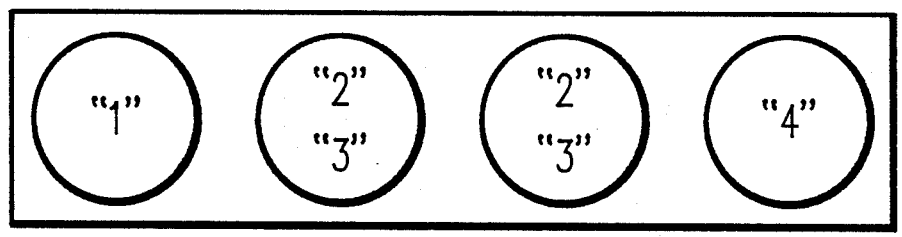
Figure 4C:
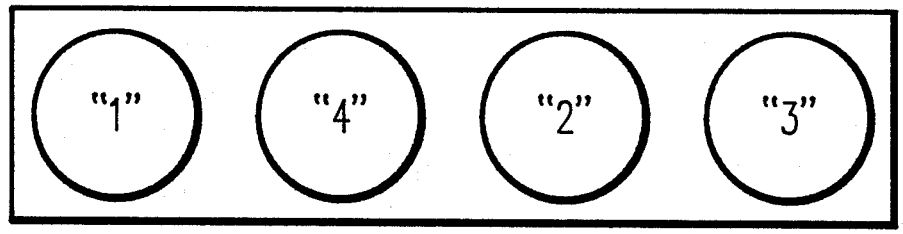
Figure 4D:
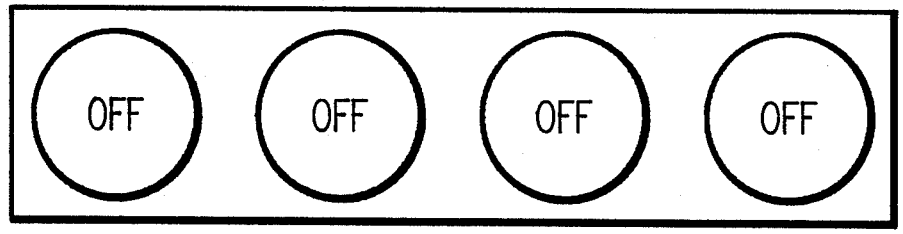

The specific pattern of the blinking LEDs in an on and off manner is considered to be an important part of the utility of the testing device. The signal generator 200 of FIG. 5 is configured to sequentially send one pulse on the first line, pause, two pulses on the second line, pause, three pulses on the third line, pause, four pulses on the fourth line, pause, and to then repeat the cycle continuously. In this configuration, the user can verify that installation of the line is correct, by visually noting the coded pulses on the receiver LEDs. In other words, the first LED would flash once, the second LED would subsequently flash twice, and so on, the pattern being an easy one to remember for the user.

If any of the wires gets crossed or shorted, it would be relatively simple to see which wires are causing the problem. Single or double shorts can be identified as well as single or double open circuits. A pause between the pulses on each line helps to keep each generated pattern visually distinct. However, some wiring errors can be detected at the receiver, but not precisely identified because in certain situations none of the LEDs will light. These particular errors include a situation where three or more open circuits occur or where all wires are shorted together. However, if the correct pattern (one flash on the first LED, two flashes on the second LED, etc.) is seen, then all of the connections are correct. Reception of the wrong pulse signal on a given wire indicates a cross connection with the wire on which the received code is transmitted. Reception of the same code on more than one wire indicates a short between the wires. A failure to receive any code on a wire indicates an open break.

FIGS. 4a-4d illustrate the signal patterns for various faulty wire connections. In FIGS. 4a-4d, the circles represent LED indicators, each associated with one wire of a four-wire line being tested, and the numerals in quotation marks indicate the number of flashes of each indicator in response to a received coded signal.

In order to create the ideal or correct pattern sequence for the signal generator 200, several methods are suggested. One preferred embodiment would be to program a single chip microcomputer to produce the pattern. This approach allows for easy changes in the tempo of the test sequence, or changes in which lines correspond to which numbers of pulses, etc., merely by changing the software. In a prototype embodiment of the present invention, a 8749 microcomputer was utilized; however, in order to extend battery life an inexpensive CMOS microcomputer could be used instead. Furthermore, for volume production of such devices, a mass-programed part would probably be cheaper.

Referring to FIG. 5, the signal generator 200 is illustrated. The power block 201 can consist of a 9 volt alkaline battery, a fixed +5 volt regulator (7805-style), filter/bypass capacitors, and a lighted on/off switch. The lighted on/off switch can also function to display that some power is left in the battery. The microcomputer 202, as previously mentioned, can be a 8749 microcomputer. The microcomputer uses a crystal to generate its own timing, contains RAM and EPROM capabilities, and a software controlled I/O port 203, which is connected to line drivers 204. The line drivers 204 will be explained in more detail. The line drivers 204 are connected to a modular jack 205 which can connect to the "S" interface bus via a modular cable.

Figure 6:
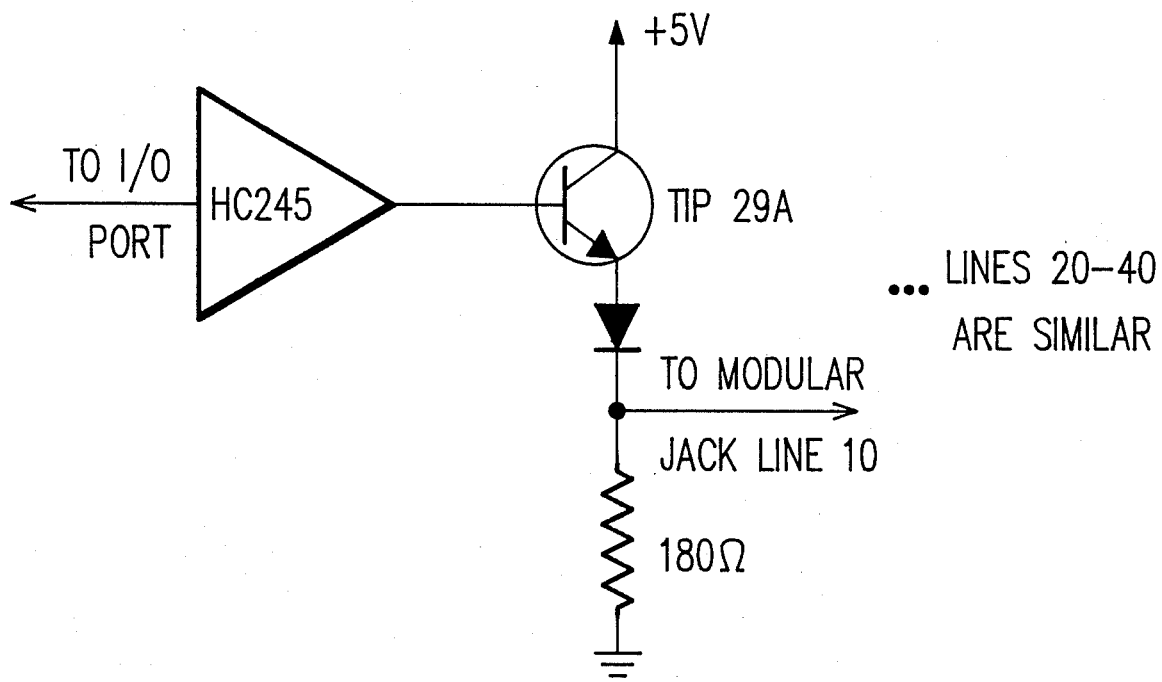
FIG. 6 shows a circuit schematic of a line driver detail utilized in the instant invention.
Figure 7:
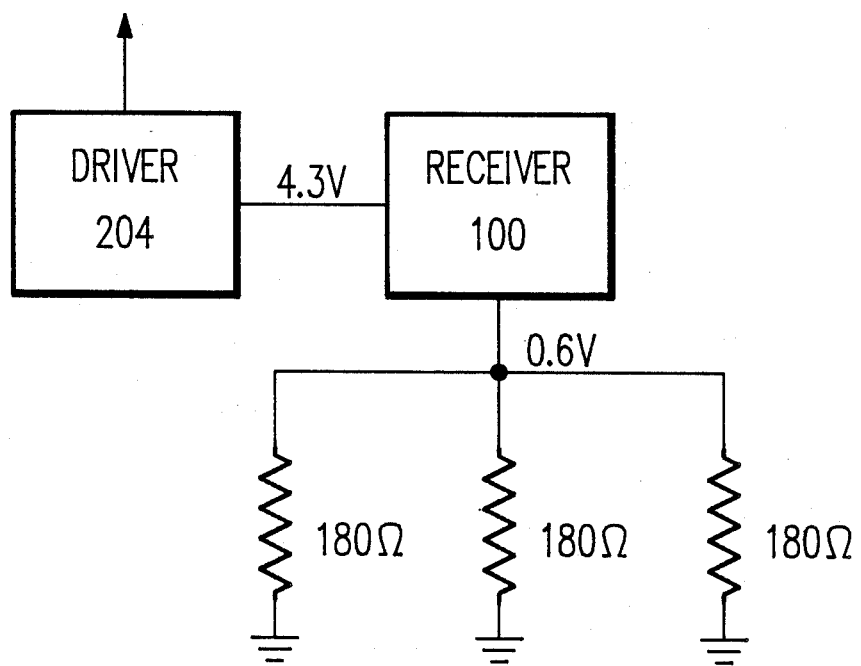
FIG. 7 shows a schematic of an equivalent circuit during normal LED driving.

FIG. 6 illustrates a schematic of the line driver 204 utilized according to the present invention. The I/O port 203 of the microcomputer 202 is buffered by HC-family CMOS bus driver logic, in order to increase the current source capability. An 74HC245 integrated circuit was utilized in the preferred embodiment in order to simplify the printed circuit board layout. A power transistor further increases the current source capability. Depending on the characteristics of the power transistor, it may be desirable to add a diode between the emitter and junction of the line and resistor, in order to protect against high voltages possibly present on the "S" interface bus. It is desirable to have the current source stronger than the current sink on a driven line, even if the line is shorted to another inactive driven line, so that both LEDs of a shorted connection will be lit. The 180 ohm pull down allows the LED current to return on the non-driven lines. The value of 180 ohms in this example was chosen in order to limit current when all the lines are shorted, and the driven transistor essentially sees four parallel 180 ohm resistors connected to ground. The 45 ohm equivalent resistance results in a current of approximately 4.3 V/45 ohms=95 ma, in a worst case situation. This current is more than an HC gate can supply, hence the transistor for the case of driving a normal LED, the circuit would be equivalent to that shown in FIG. 7.

Since the receiver drains 10 ma, the voltage across the parallel resistors is equivalent to 0.6 volts (60 ohms×10 ma). In the normal case (no shorts, open circuits, etc.), the receiver should operate correctly when the voltage exceeds an LED drop of 2.1 volts plus a diode drop of 0.6 volts plus a base-emitter drop of 0.6 volts, thus totaling 3.3 volts, since the driver voltage (4.3 volts) subtracted by the voltage drop across the parallel resistors (0.6 volts) is equivalent to 3.7 volts.

Figure 8:
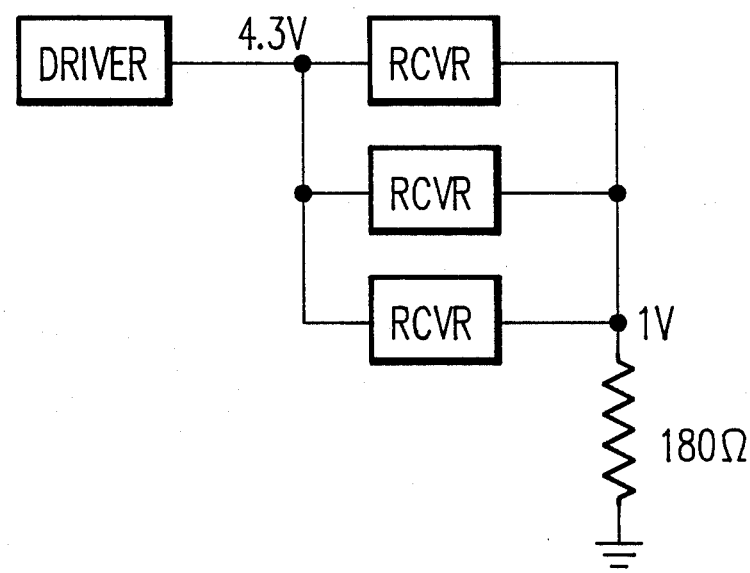
FIG. 8 shows a schematic of an equivalent circuit for driving a shorted line.

In the situation of driving three LEDs which are shorted together, the circuit schematic would be equivalent to that illustrated in FIG. 8. The 3.3 voltage drop across the receivers results in a 1 volt drop across the 180 ohm resistor. Approximately 5.5 ma flows through the resistor, and the LEDs are dimly lit with 1.85 ma of current provided for each LED.

A preferred embodiment of the signal generator of the instant invention as shown in FIG. 9 is constructed in a plastic case, preferably having dimensions approximately 1.5"×2.5"×4" for easy handling by the user. The generator has a modular jack 205 and a lighted switch 210. When the signal generator 200 and receiver 100 are interconnected by a modular cable without fault, the proper sequence of LEDs should be observed. Interconnecting the receiver and generator with cross connected, open or shorted wires will result in the various defects as previously noted, which defects are observed on the LED display 110 of the receiver 100.

The foregoing description has been set forth merely to illustrate the invention and is not intended to be limiting. Since modifications of the described embodiments incorporating the spirit and substance of the invention may occur to persons skilled in the art, the scope of the invention should be limited solely with reference to the appended claims and equivalents.

What is claimed is:

1. A system for detecting faults in a line which consists of a plurality of wires therein, comprising:
    a generating means having a generating port, which is removably connectable to one end of said line, for generating coded pulsed signals on each of said plurality of wires, and
    a receiving means having a receiving port, which is removably connectable to an opposite end of said line, for receiving and displaying said coded pulsed signals generated by said generating means, wherein
    said coded pulsed signals are uniquely distinct signals for each of said plurality of wires.

2. The system as claimed in claim 1, wherein said receiving means comprises:
    a plurality of receiving circuits connected to said receiving port, each of said plurality of receiving circuits being associated with a corresponding one of said plurality of wires, and
    a plurality of display means, each associated with a corresponding one of said receiving circuits, for displaying the coded pulsed signals generated by said generating means.

3. The system as claimed in claim 1, wherein said coded pulsed signals consist of one pulse for a first wire, two pulses for a second wire, three pulses for a third wire, and four pulses for a fourth wire.

4. The system as claimed in claim 1, wherein said line is a telephone line.

5. The system as claimed in claim 1, wherein said line is an integrated services digital network line.

6. The system as claimed in claim 1, wherein said generating port and receiving port are modular-type jacks.

7. The system as claimed in claim 2, wherein said plurality of display means are light emitting diodes.

8. The system as claimed in claim 2, wherein each of said receiving circuits includes a current limiter for controlling current supplied to said display means.

9. The system as claimed in claim 1, wherein said generating means and receiving means are hand-held portable units, and said generating means is battery operated.

10. The system as claimed in claim 9, wherein said generating means further includes a lighted on/off switch for turning on the generating means and for visually indicating battery strength of said battery power.

11. A method for testing a line for detecting faults in a line which consists of a plurality of wires, comprising the steps of:
    generating a uniquely distinct coded pulsed signal on each of said plurality of wires at one end of said line,
    receiving said coded pulsed signals generated on each of said plurality of wires at an opposite end of said line, and displaying each of the coded pulsed signals received on each of said plurality of wires at said opposite end of said line.

12. The method for testing as claimed in claim 11, said method further comprising the steps of:

coupling a generator for generating said uniquely distinct coded pulsed signals at said one end of said line with a modular jack, and coupling a receiver for receiving said coded pulsed signals to said opposite end of said line with a modular jack.

13. The method for testing as claimed in claim 11, wherein said displaying step comprises visually displaying the received coded pulsed signals by lighting LED indicators provided on said receiver.

14. The method for testing as claimed in claim 13, wherein said received coded pulsed signals are visually displayed on separate LEDs, which are provided for each of the plurality of wires in said line.

* * * * *